United States Patent [19]
Bourgeois

[11] Patent Number: 5,411,132
[45] Date of Patent: May 2, 1995

[54] ACCUMULATING ROLLER CONVEYOR

[76] Inventor: Ronald D. Bourgeois, 80 Front St., Scituate, Mass. 02066

[21] Appl. No.: 275,735

[22] Filed: Jul. 19, 1994

Related U.S. Application Data

[63] Continuation-in-part of Ser. No. 184,189, Jan. 21, 1994, Pat. No. 5,360,100.

[51] Int. Cl.⁶ .............................................. B65G 13/07
[52] U.S. Cl. ..................................... 198/790; 198/789
[58] Field of Search ................ 198/781, 782, 789, 790

[56] References Cited

U.S. PATENT DOCUMENTS

| | | | |
|---|---|---|---|
| 633,572 | 9/1899 | Cromwell | 198/790 |
| 843,519 | 2/1907 | Crane . | |
| 896,172 | 8/1908 | Thomas . | |
| 1,843,440 | 2/1932 | Blythe . | |
| 1,923,815 | 8/1933 | Fahrenwald . | |
| 2,827,153 | 3/1958 | Olk et al. . | |
| 3,040,379 | 6/1962 | Bayer . | |
| 3,306,430 | 2/1967 | Fogg . | |
| 3,344,903 | 10/1967 | Holm . | |
| 3,374,878 | 3/1968 | Kornylak | 198/789 X |
| 3,518,944 | 7/1970 | Patin | 198/789 |
| 3,581,875 | 6/1971 | Guis . | |
| 3,643,789 | 2/1972 | Werntz . | |
| 4,006,816 | 2/1977 | Werntz | 198/790 X |
| 4,013,403 | 3/1977 | Petrus . | |
| 4,103,769 | 8/1978 | Jorgensen . | |
| 4,140,486 | 2/1979 | Nitschke . | |
| 4,144,022 | 3/1979 | Fusco . | |
| 4,172,519 | 10/1979 | Leach . | |
| 4,185,735 | 1/1980 | Hammond | 198/789 |
| 4,196,312 | 4/1980 | DeGood et al. . | |
| 4,252,234 | 2/1981 | Brouwer . | |
| 4,266,659 | 5/1981 | Meyer et al. . | |
| 4,297,121 | 10/1981 | Rhonehouse . | |
| 4,332,608 | 6/1982 | Rhonehouse . | |
| 4,344,527 | 8/1982 | Vogt et al. . | |
| 4,421,482 | 12/1983 | McMaster . | |
| 4,553,931 | 11/1985 | Wachi et al. | 198/781 X |
| 4,815,588 | 3/1989 | Katsuragi et al. . | |
| 4,832,184 | 5/1989 | DeGood . | |
| 4,887,707 | 12/1989 | Harms . | |
| 4,895,247 | 1/1990 | Marchetti . | |
| 4,901,845 | 2/1990 | Zorgiebel . | |
| 4,919,256 | 4/1990 | Gebhardt | 198/790 X |
| 5,038,922 | 8/1991 | Collins et al. . | |
| 5,048,168 | 9/1991 | Vanaschen et al. . | |
| 5,082,109 | 1/1992 | Blondeau . | |
| 5,244,081 | 9/1993 | Kajii et al. . | |

*Primary Examiner*—James R. Bidwell
*Attorney, Agent, or Firm*—Shlesinger Arkwright & Garvey

[57] ABSTRACT

A roller conveyor, comprises a frame having oppositely disposed substantially parallel sides; a plurality of pulleys disposed on each side of the frame, the pulleys on one side being coaxial with the pulleys on the other side of the frame; a drive operably associated with the pulleys on one side of the frame for rotating the pulleys; and a plurality of rollers resting freely and disposed between adjacent pairs of the pulleys. Each of the rollers includes a first shaft portion and a drive sleeve secured to the first shaft portion such that rotation of the sleeve causes rotation of the respective roller and stoppage of articles being conveyed on the rollers causes slippage between the respective first shaft portion and sleeve. Each drive sleeve is engaged with the respective driven pulleys such that rotation of the driven pulleys causes corresponding rotation of the respective drive sleeves.

22 Claims, 4 Drawing Sheets

ACCUMULATING ROLLER CONVEYOR

RELATED APPLICATIONS

This application is a continuation-in-part application of Ser. No. 08/184,189, filed Jan. 21, 1994, now U.S. Pat. No. 5,360,100.

FIELD OF THE INVENTION

The present invention relates generally to roller conveyors and specifically to accumulating roller conveyors that advantageously reduce damaging back pressure.

BACKGROUND OF THE INVENTION

Prior art line shaft roller conveyors typically have their load rollers secured to the side rails of their frames. Where the line shaft drives the rollers with belts, the belts are typically directly wrapped around the rollers. For maintenance and replacement purposes, removal of the rollers would be relatively time consuming, requiring the conveyor to be shut down for a relatively longer period. In the food industry where stringent sanitary requirements are standard, cleaning the rollers would be time consuming where the rollers had to be removed for thorough cleaning.

In prior art accumulating roller conveyors, back pressure generally develops when a slow or shutdown in one portion of the processing line causes the articles being conveyed to backup. Back pressure can damage the articles being conveyed, particularly tapered and overcapped containers or soft side packages.

There is therefore a need for roller conveyors that solve the above problems.

OBJECTS AND SUMMARY OF THE INVENTION

It is an object of the present invention to provide a roller conveyor that is relatively easy to maintain.

It is another object of the present invention to provide a roller conveyor where the drive or load rollers can be relatively easily replaced.

It is still another object of the present invention to provide a roller conveyor where the drive or load rollers are not attached to the conveyor frame and are freely floating and are held in place by gravity, thereby making the replacement with different style rollers relatively easy.

It is yet another object of the present invention to provide a roller conveyor where the load rollers are not attached to the side structure of the frame.

It is another object of the present invention to provide a roller conveyor that can be driven at relatively greater speeds.

It is another object of the present invention to provide a roller conveyor that can accumulate and store tapered and overcapped containers in process, without or minimum back pressure, thereby minimizing product damage and line shutdown.

It is yet another object of the present invention to provide a roller conveyor that can be designed for single-lane infeed and outfeed or used as combiners/dividers with multiple infeeds and/or multiple outfeeds without jamming or bridging.

It is still another object of the present invention to provide a roller conveyor that can convey tapered containers as quickly and efficiently as conventional containers.

It is still another object of the present invention to provide a roller conveyor with no horizontal surfaces or exposed threads to trap products or contaminants.

It is another object of the present invention to provide a roller conveyor that maximizes the flow of laminar air through the system.

It is yet another object of the present invention to provide a roller conveyor that will generally increase line productivity without increasing packaging equipment rates.

It is still another object of the present invention to provide a roller conveyor that can feed products with very small diameters or lengths or gallon size containers.

It is yet another object of the present invention to provide a roller conveyor that can accumulate square, oval, round and rectangular containers.

In summary, the present invention provides an accumulating roller conveyor that will effectively convey and accumulate products in odd-shaped containers without damage.

These and other objects of the present invention will become apparent from the following detailed description.

DETAILED DESCRIPTION OF THE INVENTION

Figure 1:
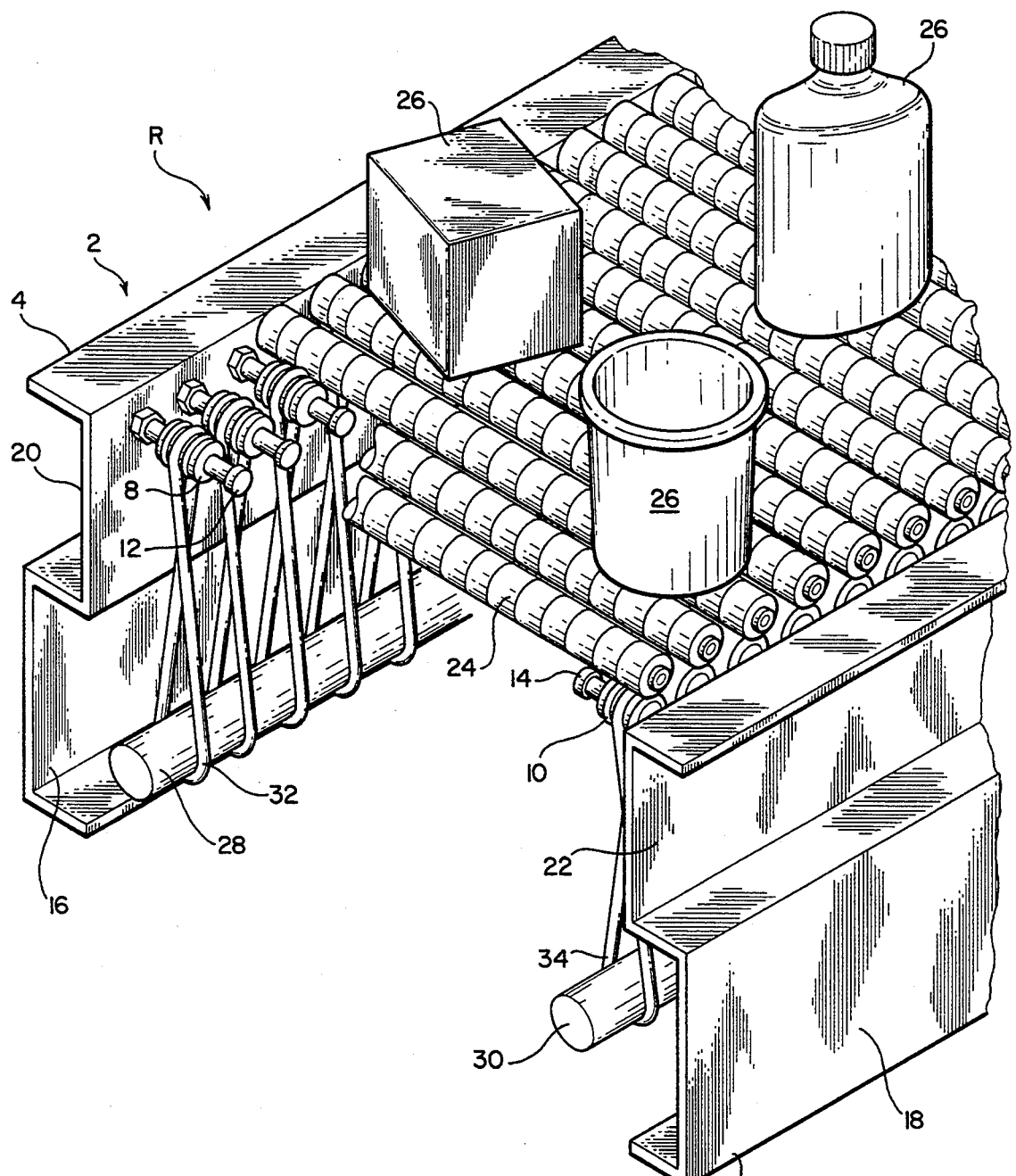
FIG. 1 is a fragmentary perspective view of an accumulating roller conveyor made in accordance with the present invention.

An accumulating roller conveyor R in accordance with the present invention is disclosed in FIG. 1. The roller conveyor R comprises a frame 2 having oppositely disposed and parallel side rails 4 and 6. A plurality of pulleys 8 and 10 rotatably supported on respective shafts 12 and 14 are disposed along the inner sides of the side rails 4 and 6, respectively. The pulleys 8 on the side rail 4 are coaxial with the pulleys 10 disposed along the side rail 6, as best shown in FIG. 1.

Figure 2:
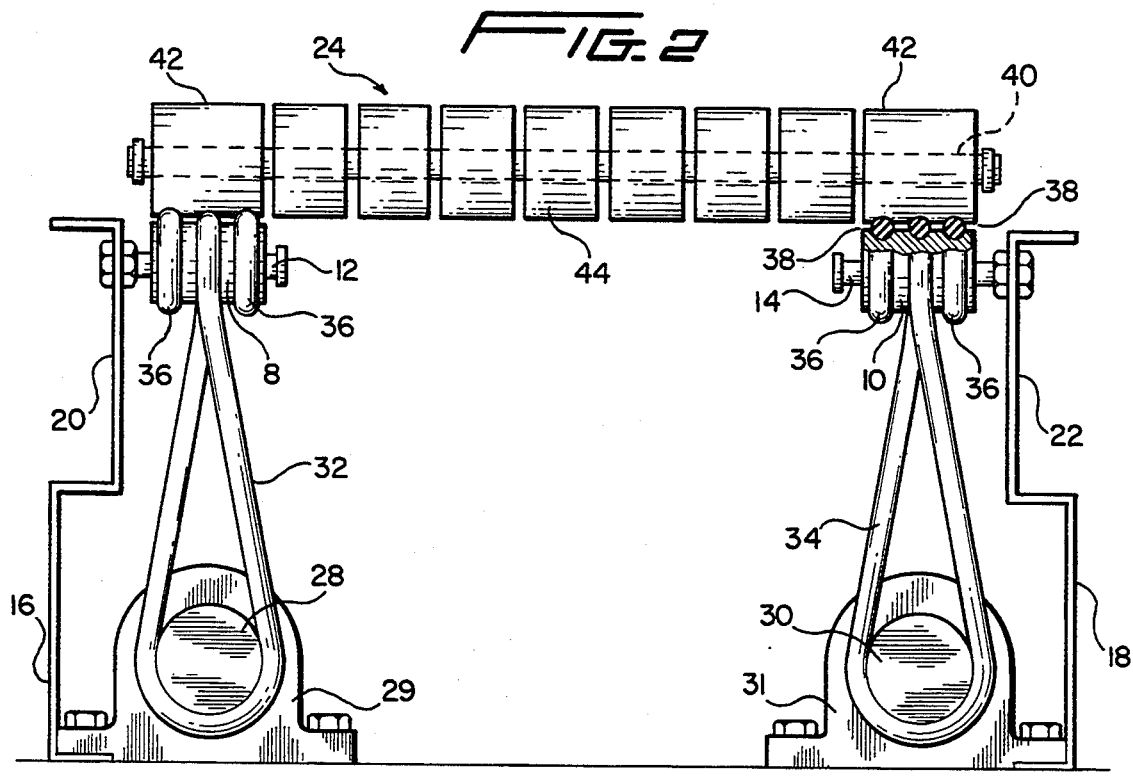
FIG. 2 is an enlarged end elevational view of the conveyor in FIG. 1.

The side rails 4 and 6 have lower portions 16 and 18 that are offset from each other such that the upper portions 20 and 22 are cantilevered from the lower portions 16 and 18, as best shown in FIGS. 1 and 2. The shafts 8 and 14 are short and do not span the distance across the side rails 4 and 6. Instead, the shafts 12 and 14 are cantilevered from the upper portions 20 and 22 from the side rails 4 and 6. The short shafts 8 and 14 advantageously permit laminar air flow through the rollers and minimizes surfaces on which dirt and the like can accumulate.

A plurality of drive or load rollers 24 rest between adjacent pulleys 8 and 10, as best shown in FIG. 1. Articles 26 being conveyed rest on the rollers 24, thereby driving the articles when the rollers rotate. The rollers 24 are disposed in spaced parallel configuration with their end portions being supported by the pulleys 8 and 10.

Line shafts 28 and 30 are disposed along the lower end of the side rails 4 and 6, respectively, and transversely to the rollers 24. The line shafts 28 and 30 are supported in bearing housings 29 and 31, respectively, as best shown in FIG. 2. The line shafts 28 and 30 are rotated by a drive motor (not shown) of standard configuration. The offset between the upper portions 20 and 22 from the respective lower portion 16 and 18 of the side rails 4 and 6 advantageously provide space for the bearing housings 29 and 31 to be positioned close to the side rails so that the pulleys 8 and 10 are thereby positioned closely to the side rails, minimizing the amount of cantilever.

A plurality of belts 32 and 34 are operably secured to the respective line shafts 28 and 30 and the respective pulleys 8 and 10 such that rotation of the line shafts 28 and 30 cause rotation of the respective pulleys 8 and 10 in the same direction about their Shafts 12 and 14. Resilient rings or tires 36 are secured around each of the pulleys 8 and 10, as best shown in FIG. 2. Each resilient ring 36 is adapted to fractionally engage the rollers 24 which are disposed on respective pairs of pulleys 8 and 10 such that rotation of the pulleys 8 and 10 cause corresponding rotation of the rollers 24.

Each of the pulleys 8 and 10 has a plurality of arcuate circumferential grooves 38 that are adapted to receive the correspondingly shaped rings 36, such as "O"-shaped rings and belts. Each of the pulleys 8 and 10 can also have different shaped annular grooves, such as rectangular annular grooves (not shown), for similarly shaped rings. The rings 36 have advantageously larger cross-sectional areas than those of the belts 32 and 34 such that the rings and not the belts engage the rollers 24. The rings 36 are advantageously disposed on each side of the respective belts 32 and 34 to balance the forces transferred by the belts to the rollers 24. The drive belts 32 and 34 and the rings 36 are preferably made of urethane or other suitable materials.

It is preferable to directly drive the pulleys 8 and 10 with their respective drive shafts 28 and 30 to advantageously balance the torque imparted to each end of the rollers 24.

Figure 3:
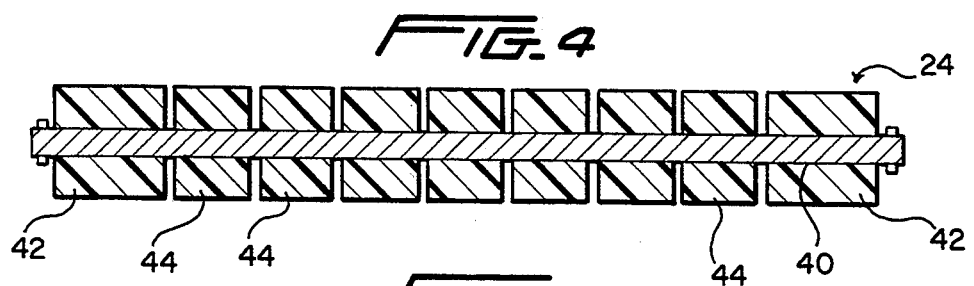
FIG. 3 is a cross-sectional view through one of the rollers of FIG. 1, showing one embodiment of the rollers used in present invention.

Each of the rollers 24 comprises a shaft 40, a pair of drive sleeves 42, each of which is disposed at respective end portions of the shaft 40, and a plurality of load sleeves 44 disposed between the pair of drive sleeves 42, as best shown in FIG. 3. The sleeves 42 and 44 are loosely fitting around the shaft 40 such that the articles 26 being conveyed resting on the load sleeves 44 will generate enough frictional forces with the shaft 40, thereby engaging the shaft 40 with the drive sleeves 42 and the load sleeves 44. The loose fitting between the shaft 40 and the sleeves 42 and 44 is also such that when the articles 26 meet an obstruction and are otherwise stopped, the load sleeves 44 will simply free wheel with respect to the shaft 40, thereby preventing or minimizing back pressure and advantageously preventing any damage to the articles 26, such as soft-sided packages like ice-cream cartons, etc. The shaft 40 is preferably made of metallic material, such as stainless steel, etc. while the sleeves 42 and 44 are preferably made of plastic material, such as Delrin, Nylon, etc.

Figure 4:
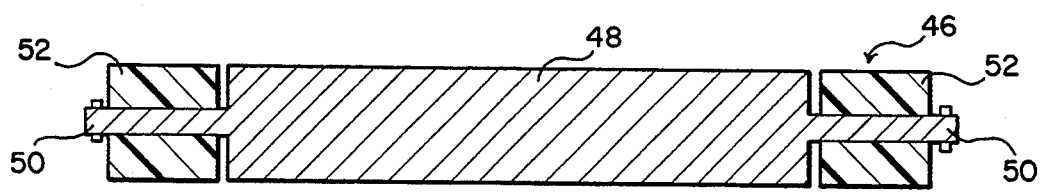
FIG. 4 is a cross-sectional view of another embodiment of a roller used in the conveyor of FIG. 1.

Another embodiment of the load roller is disclosed as roller 46, as best shown in FIG. 4. The roller 46 comprises a solid central roller 48 with reduced diameter shaft portions 50 at its end portions rotatably supporting drive sleeves 52, as best shown in FIG. 4. The drive rollers 52 are loosely fitted over the shaft portions 50 with just the right amount play such that the articles 26 being conveyed by the central rollers 48 will exert enough pressure on the drive sleeves 52 to pick up the torque from the pulleys 8 and 10, while at the same time permitting free wheeling between the drive sleeves 52 and the shaft portion 50 in case the articles 26 are stopped by an obstruction or the like.

Figure 5:
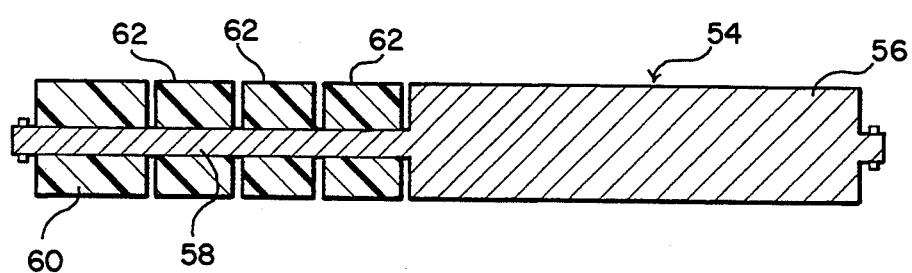
FIG. 5 is a cross-sectional view of yet another embodiment of a roller used in the conveyor of FIG. 1.

Another embodiment of the load roller is disclosed as roller 54, as best shown in FIG. 5. The roller 54 comprises a solid roller 56 with a reduced diameter shaft 58 supporting a drive sleeve 60 and a plurality of load sleeves 62. The solid roller 56 is driven by the pulleys 80 while the drive sleeve 60 is driven by the pulleys 10. The drive sleeve 60 and the load sleeves 62 are loosely fitted around the reduced diameter shaft 58 such that when the articles 26 disposed on the load sleeves 62 hit an obstruction, the load sleeve 62 will merely slip relative to the rotating reduced diameter shaft 58 and the solid roller 56, thereby advantageously preventing any damage to the articles 26. Articles disposed on the solid roller 56 will continue to be conveyed. The loose fitting of the drive sleeve 60 and the load sleeves 62 with respect to the reduced diameter shaft 58 is also such that the weight of the articles 26 disposed on the load sleeves 62 generate enough frictional forces between the drive sleeves 60 and the load sleeves 62 to transmit the rotational torque of the drive pulleys 8 to the load sleeve 62.

Figure 6:
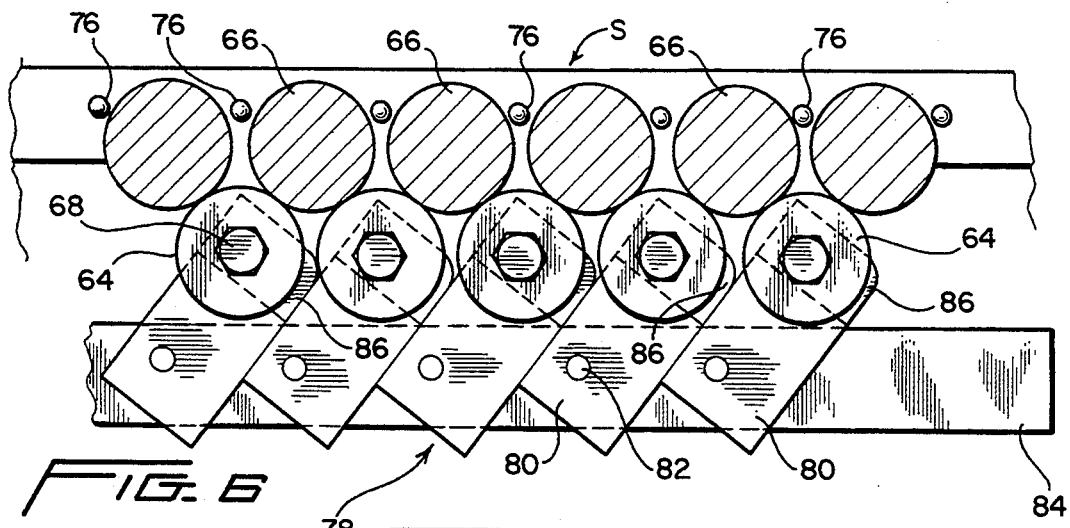
FIG. 6 is a fragmentary cross-sectional view of a section of a roller conveyor of FIG. 1, showing a lifting mechanism for disengaging a group of rollers from the driven pulleys.
Figure 7:
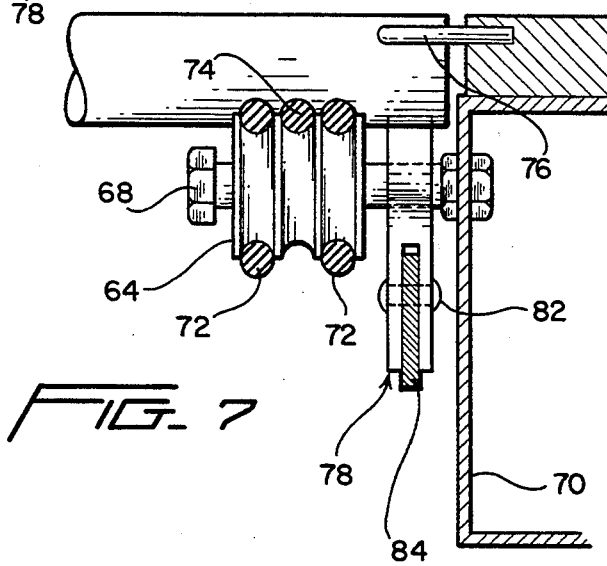
FIG. 7 is a fragmentary cross-sectional view through one of the pulleys of FIG. 6.
Figure 8:
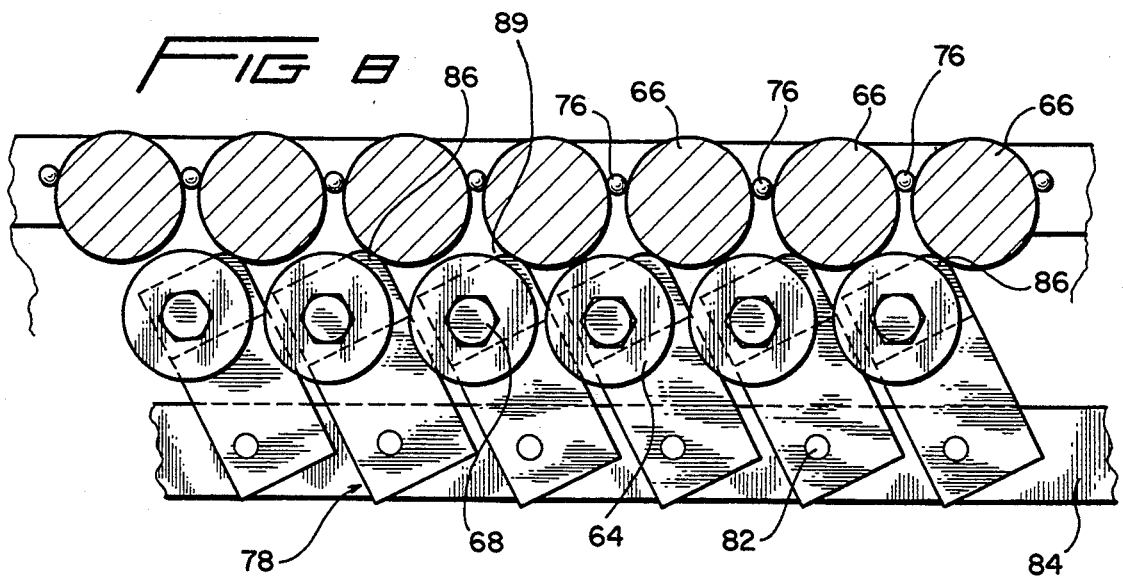
FIG. 8 is a fragmentary cross-sectional view similar to FIG. 6, showing the lifting mechanism in the operative position disengaging a group of rollers from the driven pulleys.

Another embodiment of an accumulating roller conveyor S is disclosed in FIGS. 6, 7 and 8. The conveyor S comprises a plurality of pulleys 64 supporting a plurality of rollers 66. The pulleys 64 are rotatably supported by respective shafts 68 rigidly secured to side rails 70. It should be understood that there are two opposing side rails 70 each one of which includes a plurality of pulleys 64 disposed in coaxial configuration such that the rollers 66 rest by gravity between adjacent pulleys, as similarly shown in FIG. 1. A plurality of rings 72 are secured around respective grooves in the pulleys 64 to provide frictional contact with the overlying rollers 66. A plurality of belts 74 are operably connected to respective line shafts (shown in FIG. 1).

A plurality of pins 76 are operably secured to the side rails 70 extending between adjacent rollers 66, as best shown in FIGS. 6 and 7. The pins 76 are so disposed such that the rollers 66 are prevented from completely jumping out of their places between adjacent pulleys 64. When a roller 66 inadvertently jumps up, it hits the adjacent pins 76 and rebounds back to its original place. The pins 76 are axially parallel to the rollers 66.

A lifting mechanism 78 provides a means for stopping a section of the conveyor S without shutting down the rest of the conveyor.

The lifting mechanism 78 comprises a plurality of eccentrics or cranks 80 pivotably secured to respective shafts 68, as best shown in FIGS. 6 and 7. The opposite ends of the cranks 80 are pivotally connected at 82 to a member 84 that is selectively movable in a substantially horizontal motion to engage or disengage the rollers 66 from their respective pulleys 64.

Each of the cranks 80 has a rounded portion 86 that engages and lifts the adjacent and overlying roller 66 when the member 84 is moved to the right, as best shown in FIG. 8. Each of the portions 86 extends beyond the periphery of the respective pulley 64 such that when a respective roller is resting on the portion 86, the rotating pulleys 64 are separated by space 89, thereby to disengage the pulleys 64 from the rollers 66.

Each of cranks 80 may be slotted to receive the member 84, as best shown in FIG. 7. The member 84 may be manually or power actuated by pneumatic means (not shown) of standard construction known in the art.

Figure 9:
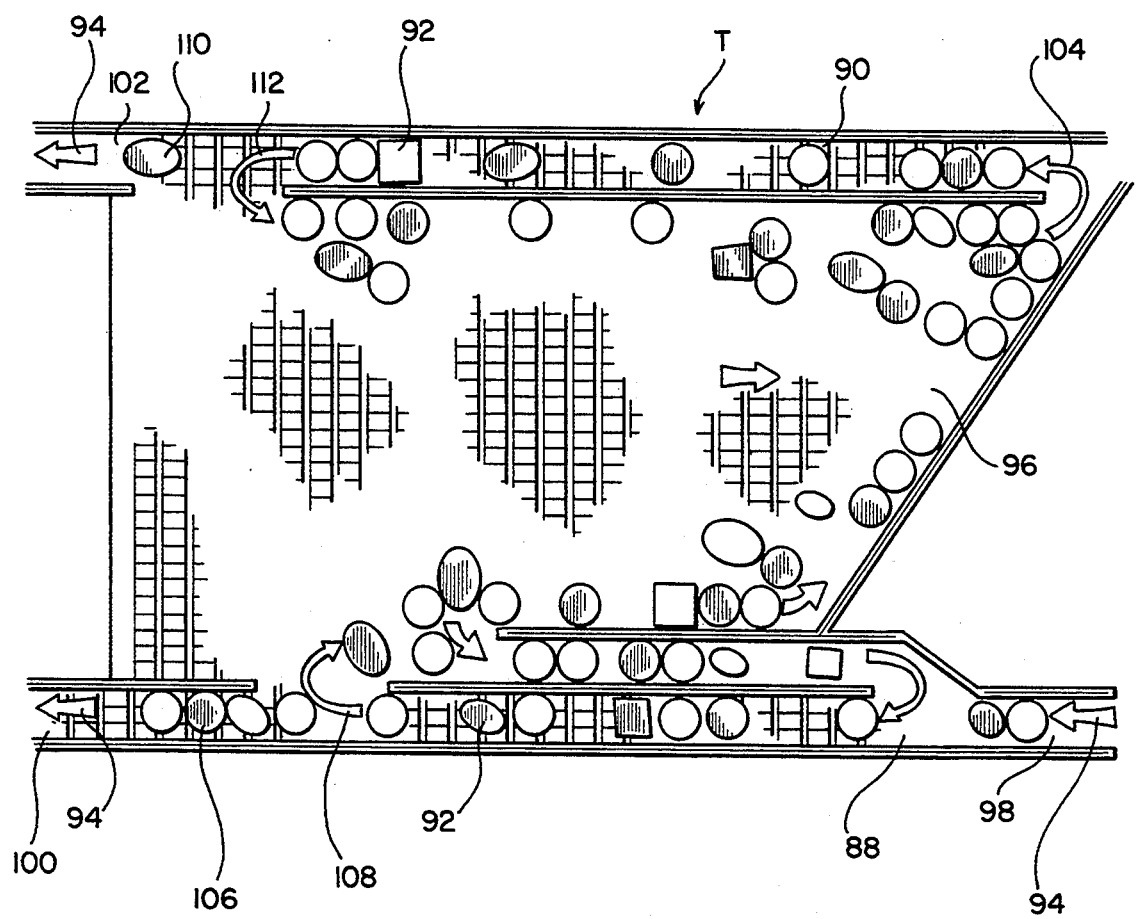
FIG. 9 is a schematic plan view of a roller conveyor system using the accumulating roller conveyor of the present invention.

The roller conveyors R and S may be utilized in a roller conveyor system T, as disclosed in FIG. 9. The system T comprises a pair of feed lanes 88 and 90 conveying a plurality of odd-shaped articles 92 in the direction generally indicated by the arrows 94. The feed lanes 88 and 90 may use the roller conveyors R and S individually or in combination, as desired. Disposed between the feed lanes 88 and 90 is a storage area 96 where excess articles 92 accumulate due to different feed rates in a production system. The rollers in the storage area 96 are typically not driven and depends on some back pressure from the feed lanes 88 and 90 to move the articles around. The lane 88 has an entrance 98 and an exit 100. The lane 90 has an exit 102 and an entrance 104 communicating with the storage area 96.

If the roller conveyor R is used in lane 88, any backup beyond the exit 100 will cause the articles 106 to stop moving, allowing the shafts 40 to slip relative to the load sleeves 24. Any articles behind will then be directed into the storage area 96 as generally indicated at 108. With slippage between the shafts 40 and the respective load sleeves 24, back pressure is advantageously reduced, thereby minimizing damage to the articles being conveyed, especially for overcapped and tapered containers, and other sensitive packages containing cheese, ice-cream, etc.

The conveyor R if used in the lane 90 will perform similar to lane 88. Any downline obstruction or shutdown beyond exit 94 will cause the article 110 to stop and the articles behind it to move into the storage area 96 as generally indicated at 112.

Instead of depending on slippage between the shafts 40 and the load sleeves 24, the lifting mechanism 78 may be used in the lanes 88 and 90 near the exits 100 and 102. By actuating the member 84 such that the respective rollers 66 are lifted up and disengaged from the respective pulleys 64, the articles carried by the lifted roller 66 will stop, causing the articles behind them to be routed to the storage area 96. The rest of the lanes 88 and 90 may use the conveyor R to advantageously reduce back pressure and thereby minimize damage to articles being conveyed.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A roller conveyor, comprising:
   a) a frame having oppositely disposed substantially parallel sides;
   b) a plurality of pulleys disposed on each side of said frame, said pulleys on one side being coaxial with said pulleys on the other side of said frame;
   c) a drive operably associated with said pulleys on one side of said frame for rotating said pulleys;
   d) a plurality of rollers resting freely and disposed between adjacent pairs of said pulleys;
   e) each of said rollers including a first shaft portion and a drive sleeve secured to said first shaft portion such that rotation of said sleeve causes rotation of the respective roller and stoppage of articles being conveyed on said rollers causes slippage between the respective first shaft portion and sleeve; and
   f) each drive sleeve is engaged with the respective driven pulleys such that rotation of said driven pulleys causes corresponding rotation of the respective drive sleeves.

2. A roller conveyor as in claim 1, wherein:
   a) said first shaft includes a plurality of load sleeves secured to said first shaft portion such that rotation of said drive sleeve causes rotation of the respective load sleeves and stoppage of the articles being conveyed on the respective load sleeves causes slippage between the respective first shaft portion and load sleeve.

3. A roller conveyor as in claim 1, wherein:
   a) each of said rollers include a second shaft portion operably associated with respective pulleys disposed on the other side of said frame; and
   b) a second drive operably associated with said pulleys disposed on the other side of said frame.

4. A roller conveyor as in claim 1, wherein:
   a) said first shaft extends through the length of each respective roller; and
   b) a plurality of load sleeves are secured on said first shaft.

5. A roller conveyor as in claim 1, wherein:
   a) said drive comprises a line shaft disposed on one side of said frame; and
   b) a plurality of belts operatively secured to said line shaft and the respective pulleys on one side of the frame.

6. A roller conveyor as in claim 1, and further comprising:
   a) a lifting mechanism operably associated with a group of said rollers for disengaging said group from said pulleys, thereby to stop said group.

7. A roller conveyor as in claim 6, wherein:
   a) said lifting mechanism includes a plurality of cranks operably associated with respective rollers in said group; and
   b) a plurality of pins secured to said sides of said frame, said pins being disposed toward each other and between and outside the periphery of said rollers.

8. A roller conveyor as in claim 7, wherein:
   a) each of said cranks includes a portion adapted to engage a respective roller;
   b) said portion lifts the respective roller when said crank is pivoted; and
   c) the lifted roller is disposed between adjacent said pins.

9. A roller conveyor as in claim 7, wherein:
a) said pulleys include shafts secured to said frame; and
b) each of said cranks is pivotally secured to respective shafts.

10. A roller conveyor, comprising:
a) a frame having oppositely disposed substantially parallel sides;
b) a plurality of pulleys disposed on each side of said frame, said pulleys on one side being coaxial with said pulleys on the other side of said frame;
c) a drive operably associated with said pulleys for rotating said pulleys;
d) a plurality of rollers resting freely and disposed between adjacent pairs of said pulleys, whereby rotation of said pulleys causes rotation of said rollers; and
e) a lifting mechanism operably associated with a group of said rollers adapted to lift and thereby disengage said group from the respective pulleys, thereby to stop said group from rotating.

11. A roller conveyor as in claim 10, wherein:
a) said lifting mechanism includes a plurality of cranks operably associated with respective rollers in said group; and
b) a plurality of pins secured to said sides of said frame, said pins being disposed toward each other and between and outside the periphery of said rollers.

12. A roller conveyor as in claim 11, wherein:
a) each of said cranks includes a portion adapted to engage a respective roller;
b) said portion is adapted to lift the respective roller when said crank is pivoted; and
c) the lifted roller is disposed between adjacent said pins.

13. A roller conveyor as in claim 11, wherein:
a) said pulleys include shafts secured to said frame; and
b) each of said cranks is pivotally secured to respective shafts.

14. A roller conveyor, comprising:
a) a frame having oppositely disposed substantially parallel sides;
b) a plurality of pulleys disposed on each side of said frame, said pulleys on one side being coaxial with said pulleys on the other side of said frame;
c) a drive operably associated with said pulleys on one side of said frame for rotating said pulleys in one direction;
d) a plurality of roller assemblies resting freely and disposed between adjacent pairs of said pulleys, whereby rotation of the driven pulleys causes rotation of said roller assemblies; and
e) each of said roller assemblies including a sleeve and a load bearing portion operably associated therewith, said sleeve being drivingly engaged with the driven pulleys such that slippage occurs between said sleeve and said load bearing portion when articles being conveyed are stopped.

15. A roller conveyor as in claim 14, wherein:
a) each of said pulleys include a resilient ring; and
b) said ring on respective driven pulleys is in frictional engagement with the respective sleeve.

16. A roller conveyor as in claim 14, wherein:
a) said pulleys include annular grooves; and
b) said rings are disposed within said grooves.

17. A roller conveyor as in claim 15, wherein:
a) said rings have circular cross-section.

18. A roller conveyor as in claim 14, wherein:
a) said drive comprises a line shaft disposed on one side of said frame; and
b) a plurality of belts operatively secured to said line shaft and the respective pulleys on one side of the frame.

19. A roller conveyor as in claim 18, wherein:
a) each of said pulleys include a plurality of grooves;
b) said belts are associated with one of said grooves; and
c) first and second rings disposed on each side of said belt and disposed in the other of said grooves.

20. A roller conveyor as in claim 14, wherein:
a) said sleeves are made of plastic.

21. A roller conveyor as in claim 14, wherein:
a) said sides of said frame includes first and second side walls;
b) said first wall is offset inwardly of said second wall; and
c) said pulleys are secured to said first wall.

22. A roller conveyor as in claim 14, wherein:
a) said pulleys include shafts secured to said frame; and
b) said shafts are cantilevered from said sides of said frame.

* * * * *